United States Patent
Dyck

[15] 3,645,566
[45] Feb. 29, 1972

[54] SADDLE-TYPE TEE CONNECTOR

[72] Inventor: Gerhard Dyck, Saskatoon, Saskatchewan, Canada

[73] Assignee: Dyckes Sprinkler Co. Ltd., Saskatoon, Saskatchewan, Canada

[22] Filed: Dec. 4, 1969

[21] Appl. No.: 832,203

[30] Foreign Application Priority Data
Dec. 20, 1968 Canada..................................038,380

[52] U.S. Cl..............................................285/197, 285/330
[51] Int. Cl...............................................................F16l 5/00
[58] Field of Search..................285/158, 189, 159, 330, 161, 285/191, 205, 206, 208, 197

[56] References Cited

UNITED STATES PATENTS

| | | | |
|---|---|---|---|
| 575,583 | 1/1897 | Atkinson | 285/191 |
| 2,680,631 | 6/1954 | Smith | 285/197 X |
| 3,248,946 | 5/1966 | Lichtenberg et al. | 285/159 |
| 3,306,358 | 2/1967 | Williams | 285/158 X |
| 3,393,409 | 7/1968 | Politz | 285/158 X |

FOREIGN PATENTS OR APPLICATIONS

| | | | |
|---|---|---|---|
| 333,727 | 3/1921 | Germany | 285/159 |

Primary Examiner—Dave W. Arola
Attorney—Craig, Antonelli and Hill

[57] ABSTRACT

A saddle-type tee fitting for a pipe is herein provided. The tee includes a particularly recited external component adapted to be situated on the exterior wall of the pipe, a particularly recited internal component adapted to be situated within the pipe near the external component, and a particular coupling means for these components.

27 Claims, 9 Drawing Figures

Patented Feb. 29, 1972

INVENTOR
GERHARD DYCK
BY
ATTORNEYS

INVENTOR
GERHARD DYCK
BY
Craig, Antonelli, Stewart & Hill
ATTORNEYS

SADDLE-TYPE TEE CONNECTOR

BACKGROUND OF THE INVENTION

1. Field of the Invention

This invention relates to a tee pipe fitting and in particular is directed to a saddle-type tee fitting for a pipe. More particularly, it is directed to a saddle-type tee fitting for a pipe which pipe is formed of a synthetic plastic material, e.g., polyethylene, polypropylene, vinyl chloride or vinylidene chloride, in which the saddle-type tee fitting is also formed of the same or a different plastic material and is adapted to be detachably secured to the said pipe.

2. Description of the Prior Art

Saddle-type tee connectors of the disposed above-described are now known but they suffer from several major disadvantages which severely limit their practical application. In the first place, the saddle-type tee connectors are inherently prone to leakage of the fluid material from within the main conduit and the connected pipe. In an effort to solve such problems, saddle-type tee connectors have been provided in which a plurality of components are 21, together with a complex series of gaskets disposed between the pieces in order to prevent, or substantially minimize, any leakage of fluids.

A second problem which has arisen is that torsional forces which are applied to the connected pipe and transmitted to the main conduit through the saddle-type tee connector have caused relative twisting motion between the tee connector and the main conduit. This has tended to bring up such problems as breakage and leakage. In an attempt to solve such problems, more rigid connections between the saddle-type tee connector and the main conduit have been suggested, including the welding of the tee connector to the main conduit by means of molten such synthetic plastic material.

SUMMARY OF THE INVENTION

1. Objectives of the Invention

An object, then, of one aspect of this invention resides in the provision of a saddle-type tee fitting for pipes as described above, in which leakage of fluid at the fitting is minimized.

An object of another aspect of this invention is the provision of a saddle-type tee fitting for pipes as described above in which the undesirable consequences of any such leakage of fluid are obviated.

An object of still another aspect of this invention is the provision of a saddle-type tee fitting for pipes as described above in which the undesirable consequences of the application of torsional forces to the connected pipe to the saddle-type tee fitting are minimized.

2. Broad Nature of the Invention

By one broad aspect of the present invention, a saddle-type tee fitting for a pipe is provided comprising: (a) an external component, adapted to sit on the exterior of the pipe, the external component including an upstanding stub and a fluid-conducting aperture therethrough along its vertical axis; (b) an internal component adapted to be disposed in the interior of the pipe, the internal component including a fluid-conducting aperture therethrough along its vertical axis; and (c) means for coupling the external component and the internal component together while substantially simultaneously preventing relative rotation of the external and internal components on application of torsional forces to the external component, the coupling means extending parallel to the fluid-conducting apertures and being disposed within at least a portion of the fluid-conducting aperture of the external component, whereby any leakage of fluid at the region of such coupling means is discharged into the fluid-conducting apertures.

By another aspect of this invention, a saddle-type tee fitting for a pipe is provided comprising: (a) an external component, adapted to sit on the exterior of the pipe, such external component including an upstanding stub and a fluid-conducting aperture therethrough along its vertical axis, and also being provided with a female coupling well, preferably as an enlargement of the fluid-conducting aperture; (b) an internal component adapted to be disposed in the interior of the pipe, such internal component including a fluid-conducting aperture therethrough along its vertical axis and also being provided with a male coupling pedestal, preferably with the fluid-conducting aperture also extending through the pedestal; and (c) means, including the frictional engagement of the male pedestal with the female coupling well for coupling the external component and the internal component together while substantially simultaneously preventing relative rotation of the external and internal components on application of torsional forces to the external component, such coupling means extending parallel to the fluid-conducting apertures and being disposed within at least a portion of the fluid-conducting aperture of the external component, whereby any leakage of fluid at the region of such coupling means is discharged into the fluid-conducting apertures.

By yet another aspect of this invention, an external component for a saddle-type tee fitting is provided, the external component comprising: (a) a base, provided with a preferably longitudinally extending concave, conduit-contacting and sealing lower surface; and (b) a substantially cylindrical hollow stub connector upstanding from the upper surface of the base and integral therewith providing a fluid-conducting passage therethrough, such connector including: (i) a female well of generally oval cross section provided with torque restrictive perimetrical walls, and which preferably is an enlargement of the fluid-conducting passage extending along the vertical axis of the connector from the lower, concave surface of the base, and a pair of hollow cylindrical preferably apertured lugs, the apertures therein extending along the long axis of the hollow stub connector and being in direct communication with the female well, the lugs being integral with, and disposed within, the hollow stub connector for use in coupling the external component to an internal component.

By still another aspect of this invention, an internal component for a saddle-type tee fitting is provided, the internal component comprising: (a) a substantially rectangular base provided with a convex upper surface and a perimetrical, upstanding, integral sealing lip extending peripherally around the rim of the base; and (b) a pedestal generally oval cross section having a torque restrictive perimetrical wall upstanding from the upper surface of the base and integral therewith, such pedestal including: (i) a fluid-conducting passage extending therethrough and through the base along its vertical axis of the base, and (ii) a pair of spaced-apart apertures, extending through the pedestal and through the base along the long axis of the pedestal through the fluid flow channel thereof for use in coupling the internal component to an external component.

By yet another aspect of this invention, there is provided in combination: (a) a pipe including an aperture in the circumference thereof; (b) an external component of a saddle-type tee fitting sitting on the pipe, the external component including an upstanding stub and a fluid-conducting aperture therethrough along its vertical axis and in registry with the aperture in the pipe; (c) an internal component disposed in the interior of the pipe, the internal component including a fluid-conducting aperture therethrough along its vertical axis and in registry with the aperture in the pipe; and (d) means coupling the external component and the internal component together while substantially simultaneously preventing relative rotation of the external and internal components on application of torsional forces to the external component, the coupling means extending parallel to the fluid-conducting apertures and being disposed within at least a portion of the fluid-conducting aperture of the external component, whereby any leakage of fluid at the region of such coupling means is discharged into the fluid-conducting apertures.

By yet another aspect of this invention, there is provided, in combination: (a) a pipe including an aperture in the circumference thereof; (b) an external component of a saddle-type tee fitting sitting on the exterior of the pipe, such external component including an upstanding stub and a fluid-conducting aperture therethrough along its vertical axis and in registry with the aperture in the pipe, and also being provided with a female coupling well, preferably as an enlargement of the fluid-conducting aperture; (c) an internal component disposed in the interior of the pipe, such internal component including a fluid-conducting aperture therethrough along its vertical axis and in registry with the aperture in the pipe and also being provided with a male coupling pedestal, preferably with the fluid-conducting aperture also extending through the pedestal, the pedestal projecting through the aperture in the pipe; and (d) means, including the frictional engagement of the male pedestal with the female coupling well, coupling the external component and the internal component together and preventing relative rotation of the external and internal components on application of torsional forces to the external component, such coupling means extending parallel to the fluid-conducting apertures and being disposed within at least a portion of the fluid-conducting aperture of the external component, whereby any leakage of fluid at the region of such coupling means is discharged into the fluid-conducting apertures.

DESCRIPTION OF THE INVENTION

1. General Description of the Invention

DESCRIPTION OF PREFERRED EMBODIMENTS

1. Embodiment of FIG. 1

Figure 1:
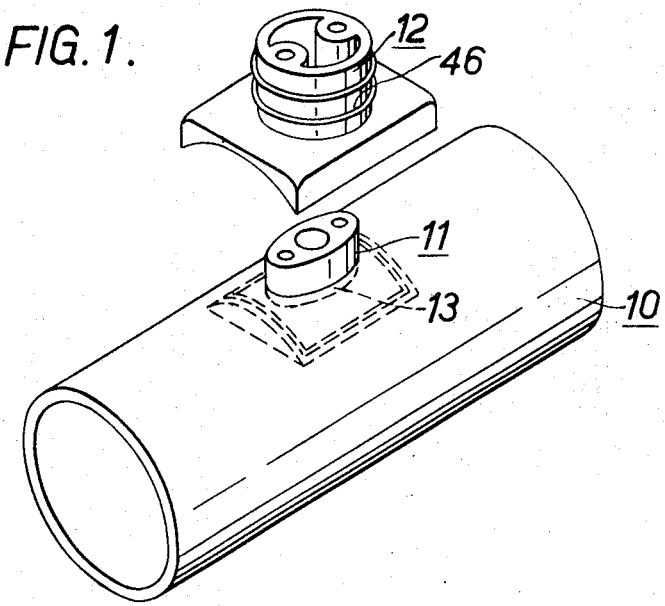
FIG. 1 is a perspective exploded view of the saddle-type tee connector and a pipe to which it is attached according to one aspect of the present invention.

In the exploded view, as shown in FIG. 1, the tubing 10 has attached thereto a saddle-type tee fitting including an internal component 11, which is disposed in the interior of the tubing 10 and which also protrudes through an aperture 13 in the circumferential sidewall of the tubing 10, and an external component 12, which sits on the circumferential exterior wall of the tubing 10 and mates with the internal component 11.

2. Detailed Description of Figures 4–6

Figure 4:
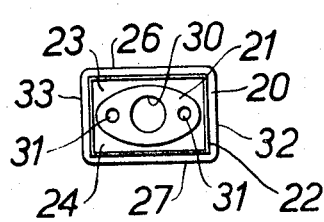
FIG. 4 is a top plan view of the internal component of the saddle-type tee fitting of an aspect of this invention as shown in FIGS. 1, 2 and 3.
Figure 5:
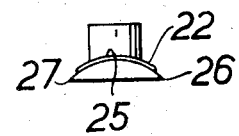
FIG. 5 is a front elevational view of the internal component of the saddle-type tee fitting shown in FIG. 4.
Figure 6:
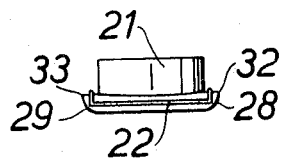
FIG. 6 is a side elevational view of the internal component of the saddle-type tee fitting shown in FIG. 4.

The construction of the internal component is shown more clearly in FIGS. 4, 5 and 6. It is seen that the internal component 11 includes a generally rectangular base 20 having an upstanding, substantially boat-shaped pedestal 21 integral therewith. The upper surface of the generally rectangular base 20 is of convex form, and it includes sealing flanges 22 extending around the perimeter, or peripheral edges thereof, spaced slightly inwardly from the longitudinally extending side edges 26, 27 and transversely extending front and rear edges and transversely extending leading and trailing edges 32, 33. Thus, there is provided a pair of longitudinally extending, upper, convex surfaces 23, 24 terminating in longitudinally extending side edges 26, 27. The transversely extending lower surfaces 28 and 29 of generally rectangular base 20 are upturned to provide thin, leading, and trailing, transversely extending edges 32, 33.

The boat-shaped pedestal 21 is provided with a fluid-conducting aperture 30 disposed along the central, vertical axis thereof, flanked by a pair of fastening apertures 31 extending axially parallel to fluid-conducting aperture 30.

3. Detailed Description of FIGS. 7–9

Figure 7:
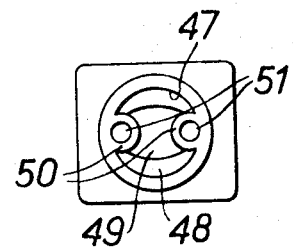
FIG. 7 is a top plan view of the external component of the saddle-type tee connector of an aspect of this invention as shown in FIGS. 1, 2 and 3.
Figure 8:
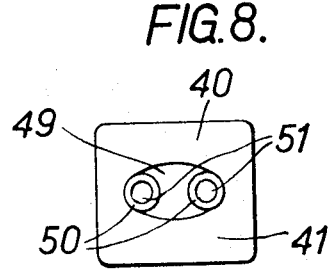
FIG. 8 is a bottom plan view of the external component of the saddle-type tee fitting shown in FIG. 7.
Figure 9:
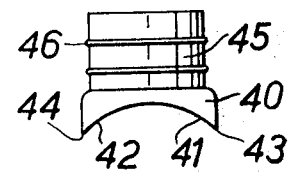
FIG. 9 is a front elevational view of the external component of the saddle-type tee fitting shown in FIG. 7.

The construction of the external component is more clearly shown in FIGS. 7, 8 and 9. The external component 12 includes a generally rectangular base 50 provided with a convex face 42 forming the longitudinally extending lower surface 41. The longitudinally extending lower surface 41 terminates at a pair of longitudinally extending side edges 43 and 44 which are adapted to form the limit of the contact between the external component 12 and the tubing 10.

The external component is provided with a substantially cylindrically shaped upstanding male connecting portion 45 having a pair of spaced-apart, peripheral gripping flanges 46. While applicant has shown these gripping flanges 46, it is to be noted that any equivalent and analogous manner of providing a positive gripping and fitting between the connecting element 45 and the pipe 53 to be coupled thereto, such as prongs, ribs, projections, etc., may be used. No further description of these means will be given herein, since they are analogous to those shown and are well known to a person skilled in the art.

As viewed from the underside, as shown in FIG. 8, the generally rectangular base 40 is provided with a substantially boat-shaped internal well 49 disposed along the central longitudinal axis thereof. The well 49 is connected to a substantially cylindrical second well 47, the cylindrical second well terminating, as viewed in FIG. 7, in a pair of ledges 48. Disposed within the confines of the cylindrical second well 47 is a pair of axially extending, generally cylindrical lugs 50, each provided with an axial screw hole 51. The axially extending, generally cylindrical lugs 50 are adapted to extend downwardly only as far as the ledges 48. Wells 47 and 49 provide the fluid-conducting aperture.

OPERATION OF THE INVENTION

Figure 2:
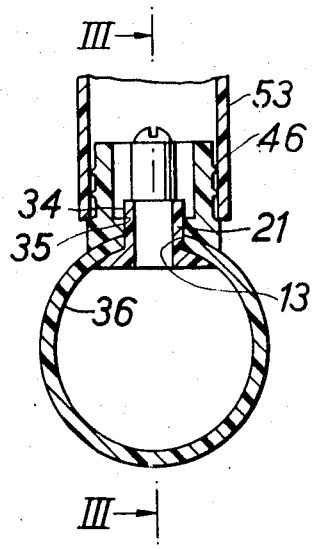
FIG. 2 is a transverse section through the saddle-type tee connector of an aspect of the present invention showing the pipe to which it is connected, and the pipe connected thereto.
Figure 3:
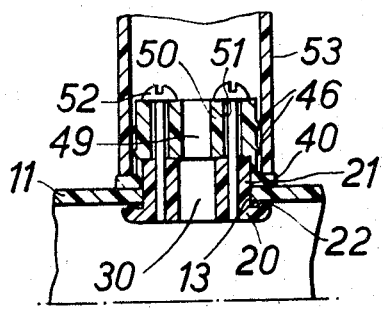
FIG. 3 is a section along the line III—III of FIG. 2.

The manner in which the saddle-type tee fitting 11, 12 is secured to the tubing 10 for providing a pipe 53 coupled thereto is shown in FIGS. 2 and 3. It is seen that the internal component 11 is disposed with its pedestal 21 extending through the aperture 13 in the side wall of the tubing 10. The aperture 13 is preferably of exactly the same shape as the cross section of the pedestal 21. In this position, the convex face 25 of the upper surface of the generally rectangular base 20 is adapted to be in engagement with the concave inner surface 36 of the tubing 10. The sealing flange 22 is in more direct contact with the convex inner surface 36 of the tubing 10 to provide more positive fluidtight sealing engagement between the generally rectangular base 20 and the tubing 10.

The external component 12 is 21, over the internal component 11 with the well 49 thereof mating with the pedestal 21 of the internal component 11. It is, therefore, preferred that the well 49 have substantially the same shape as the cross section of the pedestal 21, i.e., be similar but slightly smaller. In this way, there is positive frictional engagement between the sealing surface 34 of the pedestal 21 and the sealing surface 35 of the well 49. While applicant has shown these surfaces to be substantially smooth with sealing provided by a slightly larger size of the pedestal 21 when compared to the well 49, other means of providing more positive sealing engagement between the sealing surface 34 of pedestal 21 and the sealing surface 35 of well 49 may be provided. Such enhanced sealing means as ribs, projections, etc., may be used. These are not shown since it is believed that such enhanced sealing engagement means are analogous to those shown and would be well known to those skilled in the art.

In order more positively to couple the external component 12 to the internal component 11, a pair of screws 52 is disposed through the apertures 51 in the cylindrical male connector 45 of the external component 12, the screws being in self-tapping engagement with the aperture 31 in the pedestal 21 of the internal component 11. The pipe 53 which is coupled to the saddle-type tee fitting 11, 12 is disposed over the male connecting element 45 with its internal faces in assured gripping relationship with the gripping flanges 46. While screws 52 are shown to provide the enhanced coupling between components 11 and 12, other means, such as prong-aperture, snap fastener, etc., may be used. Such means are not shown since they are analogous to those shown and would be known to those skilled in the art.

The positioning of the connecting screws 52 within the confines of the pipe 53 is of inherent advantage since any leakage of fluid through the connecting apertures 31, 51 would inherently be led to the pipe 53 and hence any undesirable effect of such leakage would be cancelled. Furthermore, it is noted that the internal component 11 includes a pedestal 21 which extends through a similarly shaped aperture 13 in the side of the tubing 10, thereby minimizing any twisting of the tubing 10 when the external component 12 is attached to the internal component 11, if there should be any application of torsional forces to the pipe 53 attached thereto. This also is of inherent advantage. From the foregoing description one skilled in the art can easily ascertain the essential characteristics of this invention without departing from the spirit and scope thereof, and can make various changes and modifications of the invention to adapt it to various usages and conditions. Consequently, such changes and modifications are properly, equitably and intended to be within the full range of equivalence of the following claims.

I claim:
1. A saddle-type tee fitting for a pipe, comprising:
   a. an external component, adapted to sit on the exterior of the pipe, said external component including an upstanding stub and a fluid-conducting aperture therethrough along its vertical axis;
   b. an internal component adapted to be disposed in the interior of the pipe, said internal component including a fluid-conducting aperture therethrough along its vertical axis, the fluid-conducting aperture of the internal component adapted to be in registry with the fluid-conducting aperture of the external component; and
   c. means for coupling the external component and the internal component together while substantially simultaneously preventing relative rotation of the external and internal components on application of torsional forces to the external component, said means extending parallel to the fluid-conducting apertures and being disposed at least partially within the fluid-conducting aperture of the external component, whereby any leakage of fluid at the region of the coupling means is discharged into the fluid-conducting apertures.
2. The saddle-type tee fitting of claim 1 wherein the coupling means includes male-female mating elements.
3. The saddle-type tee fitting of claim 2 wherein the male element is integral with the internal component and, correspondingly, the female element is integral with the external component.
4. The saddle-type tee fitting of claim 3 wherein the coupling means includes enhanced frictional engagement between the male-female mating elements.
5. The saddle-type tee fitting of claim 3 wherein the coupling means includes connecting elements engaging both the external component and the internal component.
6. The saddle-type tee fitting of claim 5 wherein the coupling means comprises screws engaging registering apertures in the external component and in the internal component.
7. The saddle-type tee fitting for a pipe, as claimed in claim 1 wherein:
   said external component also is provided with a female coupling well;
   said internal component is also provided with a male coupling pedestal; and
   said means for coupling the internal component and the external component together includes means coupling the frictional engagement of the male pedestal with the female coupling well thereby coupling the external component and the internal component together.
8. The saddle-type tee fitting of claim 7 wherein the female coupling well of the external component is an enlargement of the fluid-conducting aperture.
9. The saddle-type tee fitting of claim 8 wherein the fluid-conducting aperture of the internal component extends through the male coupling pedestal.
10. The saddle-type tee fitting of claim 7 wherein the coupling means includes enhanced frictional engagement between the male-female mating elements.
11. The saddle-type tee fitting of claim 7 wherein the coupling means includes connecting elements engaging both the external component and the internal component.
12. The saddle-type tee fitting of claim 11 wherein the coupling means comprises screws engaging registering apertures in the external component and in the internal component.
13. An external component for a saddle-type tee fitting, comprising:
   a. a base, provided with a concave conduit-contacting and sealing lower surface; and
   b. a substantially cylindrical, hollow stub connector upstanding from the upper surface of the base and integral therewith, providing a fluid-conducting passage therethrough, said connector including:
      i. a female well of generally oval cross section provided with torque restrictive perimetrical walls, and extending along the vertical axis of the connector from the lower, concave surface of the base, and
      ii. a pair of hollow, all lying outside of said well cylindrical apertured lugs, the apertures therein extending along the long axis of the hollow stub connector and being in direct communication with the female well, the lugs being integral with, and disposed within, the hollow stub connector for use in coupling the external component to an internal component.
14. The external component of claim 13 wherein the concave lower surface extends along the longitudinal axis of the base.
15. The external component of claim 13 wherein the female well is an enlargement of the fluid-conducting passage.
16. An internal component for a saddle-type tee fitting comprising:
   a. a substantially rectangular base provided with a convex upper surface and with a perimetrical, upstanding, integral sealing lip extending peripherally around the rim of the base; and
   b. a pedestal of generally oval cross section having a torque restrictive perimetrical wall upstanding from the upper surface of the base and integral therewith, said pedestal including:
      i. a fluid-conducting passage extending therethrough and through the base along the vertical axis of the base, and
      ii. a pair of spaced-apart apertures extending through the pedestal and through the base along the long axis of the pedestal for use in coupling the internal component to an external component through a fluid flow channel thereof.
17. In combination:
   a. a pipe including an aperture in the circumference thereof;
   b. an external component of a saddle-type tee fitting sitting on the pipe, the external component including an upstanding stub for use in coupling another pipe thereto, and also including a fluid-conducting aperture therethrough along its vertical axis and in registry with the aperture in the pipe;
   c. an internal component of a saddle-type tee fitting disposed within the pipe, the internal component including a fluid-conducting aperture therethrough along its vertical axis and in registry with the aperture in the pipe; and d. means coupling the external component and the internal component together while substantially simultaneously preventing relative rotation of the external and internal components on application of torsional forces to the external component, said means extending parallel to the fluid-conducting apertures and being disposed within the fluid-conducting aperture of the external component, whereby any leakage of fluid at the region of the coupling means is discharged into the fluid-conducting apertures.

18. The combination of claim 17 wherein the coupling means includes male-female mating elements, in which the male element is of a cross section similar to that of the aperture in the pipe, and extends therethrough.

19. The combination of claim 18 wherein the coupling means includes enhanced frictional engagement between the male-female mating elements.

20. The combination of claim 18 wherein the coupling means includes connecting elements engaging both the external component and the internal component.

21. The combination of claim 20 wherein the coupling means comprises screws engaging registering apertures in the external component and in the internal component.

22. The combination of claim 18 wherein the upstanding stub is provided with means for enhancing the engagement with a pipe coupled thereto.

23. The combination of claim 17 wherein:
said external component of said saddle-type tee fitting includes an upstanding stub cylindrical member thereon for use in coupling another pipe thereto and also wherein it is provided with a female coupling well, the female coupling well being in registry with the aperture in the pipe;
said internal component including a male coupling pedestal, the pedestal projecting through the aperture in the pipe; and
said means for coupling the external component and the internal component together while substantially simultaneously preventing relative rotation of the external and internal components on application of torsional forces to the external and internal components on application of torsional forces to the external component includes the frictional engagement of the male coupling pedestal with the female coupling well.

24. The combination of claim 23 wherein the female coupling well, the male coupling pedestal and the aperture in the pipe have a similar cross section.

25. The combination of claim 24 wherein the coupling means includes enhanced frictional engagement between the male-female mating elements.

26. The combination of claim 25 wherein the coupling means includes enhanced frictional engagement between the male-female mating elements.

27. The combination of claim 26 wherein the coupling means includes enhanced frictional engagement between the male-female mating elements.

* * * * *